United States Patent
Agami et al.

(10) Patent No.: US 7,174,356 B2
(45) Date of Patent: Feb. 6, 2007

(54) COMPLEX MULTIPLICATION METHOD AND APPARATUS WITH PHASE ROTATION

(75) Inventors: Gregory Agami, Arlington Heights, IL (US); Ronald Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 706 days.

(21) Appl. No.: 10/602,951

(22) Filed: Jun. 24, 2003

(65) Prior Publication Data

US 2004/0267860 A1    Dec. 30, 2004

(51) Int. Cl.
*G06F 7/52*    (2006.01)
(52) U.S. Cl. ..................................... 708/622
(58) Field of Classification Search .............. None
See application file for complete search history.

(56) References Cited

U.S. PATENT DOCUMENTS 6,307,907 B1 *  10/2001  Kim ........................ 375/377
6,535,562 B1 *  3/2003   Mohseni et al. ............ 375/296
7,020,111 B2 *  3/2006   Ozluturk et al. ............ 370/335

OTHER PUBLICATIONS

3rd Generation Partnership Project 2 ("3GPP2"), "Physical Layer Standard for cdma2000 Spread Spectrum Systems, Release C," 3GPP2 C.S0002-C, Version 1.0, May 28, 2002, 509 pages.
3rd Generation Partnership Project; Technical Specification Group Radio Access Network; Spreading and Modulation (FDD) (Release 5), 3GPP TS 25.213 V5.2.0 (Sep. 2002), 28 pages.

* cited by examiner

*Primary Examiner*—D. H. Malzahn

(57) ABSTRACT

A method and apparatus for complex multiplication includes steps of: (a) receiving a complex multiplicand having a real value and an imaginary value (704); (b) generating a negation of the real value of the complex multiplicand (706); (c) generating a negation of the imaginary value of the complex multiplicand (708); (d) receiving a complex multiplier (710); and (e) selecting a phasor constant having a value wherein a complex product of the complex multiplicand times the complex multiplier times the phasor constant has a real value equal to one of the real value of the complex multiplicand, the imaginary value of the complex multiplicand, the negation of the real value of the complex multiplicand, and the negation of the imaginary value of the complex multiplicand (712).

20 Claims, 4 Drawing Sheets

—PRIOR ART—

COMPLEX MULTIPLICATION METHOD AND APPARATUS WITH PHASE ROTATION

BACKGROUND OF THE INVENTION

1. Field of the Invention

The present invention relates generally to multiplication of complex numbers. More specifically, but without limitation thereto, the present invention relates to a method and apparatus for chip scrambling of a spread spectrum communications signal.

2. Description of Related Art

Spread spectrum communications systems such as code division multiple access (CDMA) and wideband code division multiple access (W-CDMA) encode subscriber signals individually so that several subscribers can use the same frequency channel concurrently without interfering with one another. As a result of higher signal frequency bandwidth, wideband code division multiple access provides improved processing gain and superior multi-path resolution compared to previous code division multiple access communications systems. Wideband code division multiple access communications systems also operate with both circuit and packet-switched high-bit-rate services to support concurrent operation of mixed services and a wide range of variable user data rates.

Both code division multiple access and wideband code division multiple access use complex chip scrambling to spread the transmission spectrum uniformly across the entire allocated bandwidth. A chip is a coded sequence of bits that constitutes the smallest unit of a spreading code. The rate at which chips are transmitted in a spread spectrum communications signal is called the chip rate. In general, the higher the chip rate, the wider the bandwidth of the resulting signal.

In wideband code division multiple access, the maximum chip rate is 3.84 Mchips/s, extending the width of each frequency band to 5 MHz. In CDMA2000-based communications systems such as 1XRTT and 1xEV-Dv, a pseudo-random noise (PN) generator is used to generate a spreading code to scramble transmitted chips. Gold code sequences are used to scramble chips in the European standard UMTS-based systems.

Such prior art techniques, while they may be suitable for some applications, are nevertheless not wholly satisfactory for small devices in which a minimum amount of circuitry is desirable.

BRIEF DESCRIPTION OF THE DRAWINGS

The present invention is illustrated by way of example and not limitation in the accompanying figures, in which like references indicate similar elements throughout the several views of the drawings, and in which.

Elements in the figures are illustrated for simplicity and clarity and have not necessarily been drawn to scale. For example, the dimensions of some elements in the figures may be exaggerated relative to other elements to point out distinctive features in the illustrated embodiments of the present invention.

DESCRIPTION OF THE ILLUSTRATED EMBODIMENTS

The present invention provides a method and apparatus for complex multiplication that may be used advantageously, for example, in a scrambling/de-scrambling circuit for spread spectrum communications systems as well as in other applications not necessarily limited to the field of spread spectrum communications. The application of a method and apparatus of the present invention to spread spectrum communications systems, for example, code division multiple access (CDMA) and wideband code division multiple access (W-CDMA) communications systems, offers benefits that include greater dynamic range of the transmitted signal, reduced signal clipping, smaller gate count and corresponding circuit area, faster scrambling speeds, and improved circuit reliability using fewer components and fewer steps than required by previous scrambler/de-scramblers previously used in cellular telephone devices.

In one aspect of the present invention, a method for complex multiplication includes steps of: (a) receiving a complex multiplicand having a real value and an imaginary value; (b) generating a negation of the real value of the complex multiplicand; (c) generating a negation of the imaginary value of the complex multiplicand; (d) receiving a complex multiplier; and (e) selecting a phasor constant having a value wherein a complex product of the complex multiplicand times the complex multiplier times the phasor constant has a real value equal to one of the real value of the complex multiplicand, the imaginary value of the complex multiplicand, the negation of the real value of the complex multiplicand, and the negation of the imaginary value of the complex multiplicand.

Previous scrambling techniques used to generate spread spectrum communications signals, for example, in code division multiple access and wideband code division multiple access communications systems, perform a complex multiplication of a complex chip value times a scrambling code value:

$$C_I + jC_Q = (D_I + jD_Q)(M_I + jM_Q)$$

$$C_I = D_I M_I - D_Q M_Q$$

$$C_Q = D_I M_Q + D_Q M_I \quad (1)$$

where $D_I$ is the real chip value, $D_Q$ is the imaginary chip value, $C_I$ is the real scrambled chip value, $C_Q$ is the imaginary scrambled chip value, $M_I$ is the real value of the scrambling code $S_I$ mapped to $\pm 1$ (for example, 0 is mapped to +1, and 1 is mapped to −1), and $M_Q$ is the imaginary value of the scrambling code $S_Q$ mapped to $\pm 1$.

Figure 1:
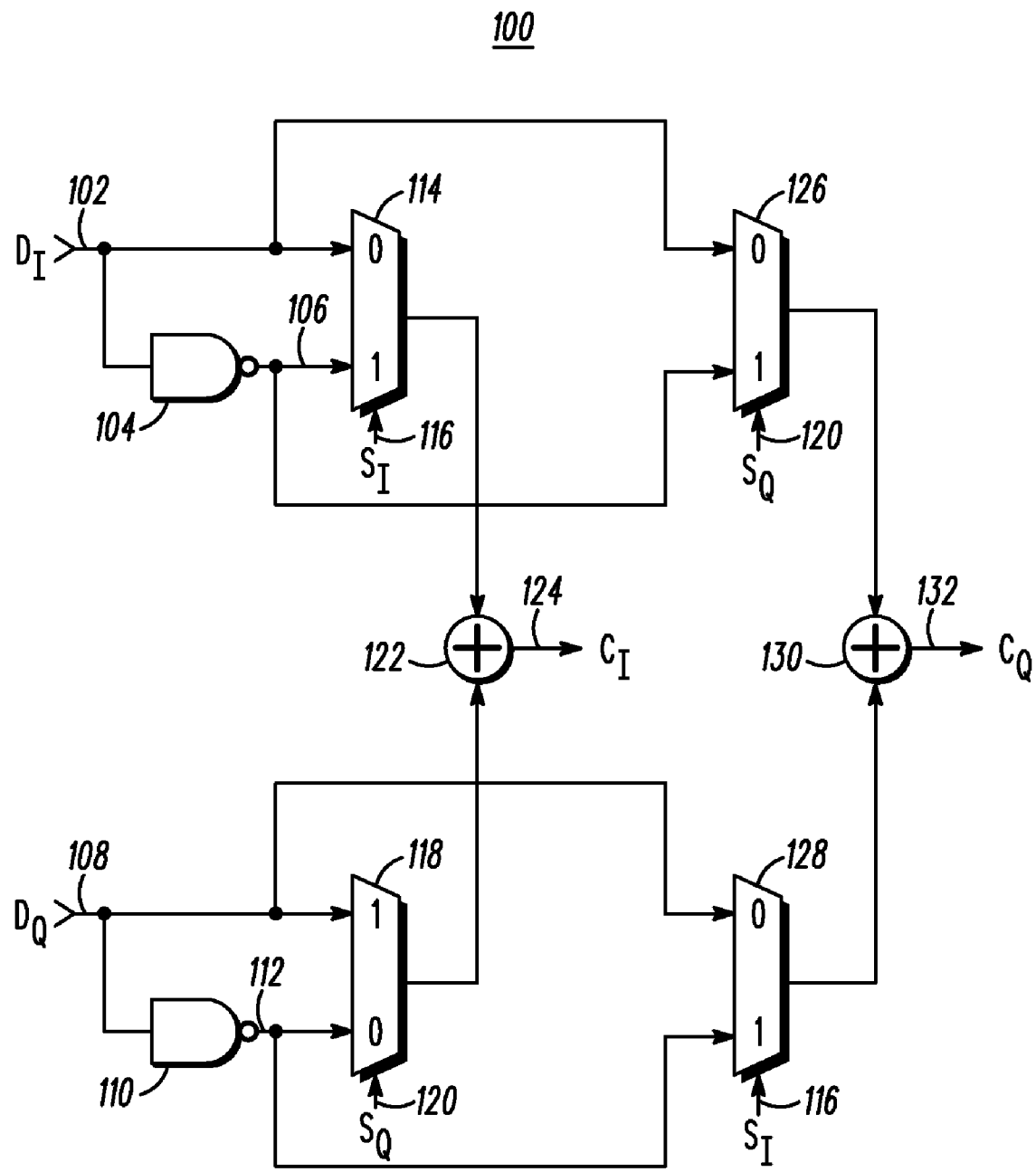
FIG. 1 illustrates a typical scrambling circuit of the prior art.

The multiplication formula (1) is typically implemented in the prior art as four 2-input multiplexers, two adders, and two negation blocks as shown in FIG. 1.

FIG. 1 illustrates a typical scrambling circuit 100 of the prior art. Shown in FIG. 1 are a real chip value $D_I$ 102, a first negation block 104, a negated real chip value $-D_I$ 106, an imaginary chip value $D_Q$ 108, a second negation block 110, a negated imaginary chip value $-D_Q$ 112, a first 2-input multiplexer 114, a real scrambling code value $S_I$ 116, a second 2-input multiplexer 118, an imaginary scrambling code value $S_Q$ 120, a first adder 122, a real scrambled chip value $C_I$ 124, a third 2-input multiplexer 126, a fourth 2-input multiplexer 128, a second adder 130, and an imaginary scrambled chip value $C_Q$ 132.

In FIG. 1, the negation blocks 104 and 110 receive the real chip value $D_I$ 102 and the imaginary chip value $D_Q$ 108 respectively and generate the negated real chip value $-D_I$ 106 and the negated imaginary chip value $-D_Q$ 112. The multiplexer 114 receives the real chip value $D_I$ 102 and the negated real chip value $-D_I$ 106 and selects the augend for the adder 122 in response to the real scrambling code value $S_I$ 116. The multiplexer 118 receives the imaginary chip value $D_Q$ 108 and the negated imaginary chip value $-D_Q$ 112 and selects the addend for the adder 122 in response to the imaginary scrambling code value $S_Q$ 120. The adder 122 sums the outputs of the multiplexers 114 and 118 to generate the real scrambled chip value $C_I$ 124. The multiplexer 126 receives the real chip value $D_I$ 102 and the negated real chip value $-D_I$ 106 and selects the augend for the adder 130 in response to the imaginary scrambling code value $S_Q$ 120. The multiplexer 128 receives the imaginary chip value $D_Q$ 108 and the negated imaginary chip value $-D_Q$ 112 and generates the addend for the adder 130 in response to the real scrambling code value $S_I$ 116. The adder 130 sums the outputs of the multiplexers 126 and 128 to generate the imaginary scrambled chip value $C_Q$ 132.

The scrambler 100 shown in FIG. 1 may be used to scramble chips for transmitting a spread spectrum communications signal using the scrambling code $(M_I+jM_Q)$ and to descramble chips for receiving a spread spectrum communications signal by replacing the scrambling code $(M_I+jM_Q)$ by its conjugate $(M_I-jM_Q)$. The scrambler 100 may be implemented as a descrambler, for example, by swapping the inputs of multiplexers 118 and 126 so that the "0" is above the "1" in the multiplexer 118, and so that the "1" is above the "0" in the multiplexer 126.

Figure 2:
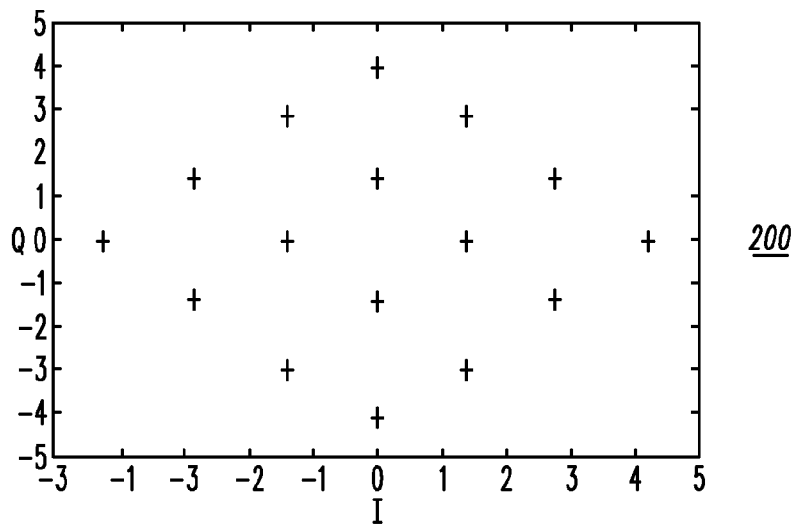
FIG. 2 illustrates a typical lattice plot of a 16-QAM signal after scrambling using the scrambler of FIG. 1.

FIG. 2 illustrates a typical lattice plot 200 of a 16-QAM signal after scrambling using the scrambler 100 of FIG. 1. A 16-QAM signal is a quadrature amplitude modulation signal having 16 possible chip values. For a 12-bit digital-to-analog converter (DAC), 11-bit clipping is required along the I and Q axes of the lattice plot 200. As may be appreciated from the lattice plot 200, the I and Q axes are rotated with respect to the lattice geometry of the scrambled chip values for a 16-QAM signal.

A disadvantage of the scrambler of FIG. 1 whether used as a scrambler or a descrambler is the possibility of clipping resulting from the addition performed by the adders 122 and 130. Because each scrambled chip value is the sum of two input values, the bit width of the scrambled chip must be one more than the bit width of the inputs to allow for a maximum gain of two. However, the overall gain of the scrambler 100 is only the square root of two. As a result, the maximum possible output power of the scrambler 100 is reduced by 3 dB. If the input to the scrambler is increased in amplitude to compensate for the 3 dB loss, the scrambled chip signal may be clipped, which would have undesirable consequences. Alternatively, extra scaling may be used at the output of the scrambler 100 to achieve the desired power, but at the cost of additional hardware.

In contrast to the scrambler 100 of FIG. 1, a method and apparatus for complex multiplication may be implemented, for example, in spread spectrum communications devices such as cellular telephones to scramble and descramble chips while advantageously avoiding the clipping problem. In addition, the various embodiments for effecting complex multiplication described herein results in reduced complexity of the scrambling/descrambling circuit.

In one embodiment, an apparatus for complex multiplication includes means for receiving a complex multiplicand having a real value and an imaginary value; means for generating a negation of the real value of the complex multiplicand; means for generating a negation of the imaginary value of the complex multiplicand; means for receiving a complex multiplier; and means for generating a complex product of the complex multiplicand times the complex multiplier times a phasor constant wherein the phasor constant has a value selected so that for each possible value of the complex multiplicand, the complex product has a real value equal to one of the real value of the complex multiplicand, the imaginary value of the complex multiplicand, the negation of the real value of the complex multiplicand, and the negation of the imaginary value of the complex multiplicand.

Instead of generating a product of a complex chip value times the complex scrambling code value, a method and apparatus for complex multiplication of the present invention generates the product of a complex chip value times the complex scrambling code value times a phasor constant as expressed by the following complex multiplication formulas:

$$C_I+jC_Q=(D_I+jD_Q)(M_I+jM_Q)(1+j)/2$$

$$C_I=(D_I M_I-D_Q M_Q-D_I M_Q-D_Q M_I)/2$$

$$C_Q=(D_I M_Q+D_Q M_I+D_I M_I-D_Q M_Q)/2 \quad (2)$$

The possible values for the scrambled chip value may then be found from a lookup table as illustrated in Table 1 below:

TABLE 1

| $S_I$ | $S_Q$ | $C_I$ | $C_Q$ |
|---|---|---|---|
| 0 | 0 | $-D_Q$ | $D_I$ |
| 0 | 1 | $D_I$ | $D_Q$ |
| 1 | 0 | $-D_I$ | $-D_Q$ |
| 1 | 1 | $D_Q$ | $-D_I$ |

As may be appreciated from Table 1, the scrambled chip values $C_I$ and $C_Q$ of the complex product $(C_I+jC_Q)$ are generated for each value of the complex scrambling code $(S_I+jS_Q)$ mapped to the complex multiplier $(M_I+jM_Q)$ in formulas (2). The complex product $(C_I+jC_Q)$ is generated simply by negating the values $D_I$ and $D_Q$ of the complex chip value $(D_I+jD_Q)$ and selecting the corresponding value of $D_I$, $D_Q$, $-D_I$, and $-D_Q$ that is representative of the complex product $(C_I+jC_Q)$ of the complex chip value $(D_I+jD_Q)$ times the multiplier $(M_I+jM_Q)$ times the phasor constant $(P_I+jP_Q)$. In this example, the phasor constant $(P_I+jP_Q)$ has a value equal to $(1+j)/2$, which results in an overall gain of unity and a phase rotation angle of 45, 135, 225 or 315 degrees.

Advantageously, the phasor constant $(P_I+jP_Q)$ has a value selected so that the complex product $(C_I+jC_Q)$ may be represented by a single corresponding value of $D_I$, $D_Q$, $-D_I$, or $-D_Q$ for each of the possible complex chip values $(D_I+jD_Q)$.

Another important feature of the present invention is that by introducing a phase offset in the generation of the scrambled chip sequence, the scrambling and descrambling functions may advantageously be implemented, for example, simply by a lookup table without the addition functions required by the scrambler 100 of FIG. 1. A 45-degree phase offset is equivalent to a 45-degree phase rotation introduced over the air interface between a transmitter and a receiver in a spread spectrum communications system, in that the phase rotation has an identical effect on all physical channels, that is, the pilot channel and the traffic channels. Accordingly, the phase rotation introduced by the method illustrated in Table 1 may be used to transmit the communications signal and may be removed by the channel correction block in the receiver to accommodate a conventional descrambling technique in the receiver to suit specific applications.

Figure 3:
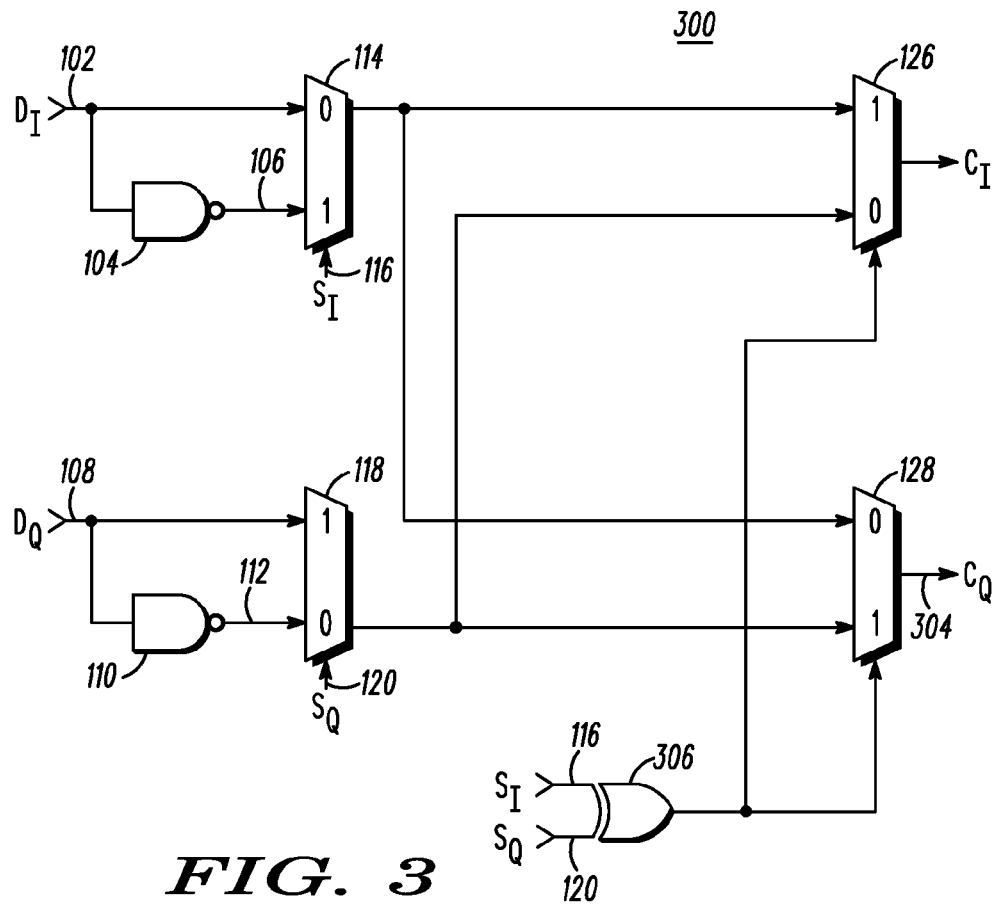
FIG. 3 illustrates a diagram of a complex multiplication circuit according to an embodiment of the present invention.

In one embodiment of the present invention, Table 1 may be implemented, for example, as a circuit having four 2-input multiplexers, two negation blocks, and an exclusive-OR function as illustrated in FIG. 3.

FIG. 3 illustrates a diagram of a complex multiplication circuit 300 according to an embodiment of the present invention. Shown in FIG. 3 are a real chip value $D_I$ 102, a first negation block 104, a negated real chip value $-D_I$ 106, an imaginary chip value $D_Q$ 108, a second negation block 110, a negated imaginary chip value $-D_Q$ 112, a first 2-input multiplexer 114, a real scrambling code value $S_I$ 116, a second 2-input multiplexer 118, an imaginary scrambling code value $S_Q$ 120, a third 2-input multiplexer 126, a fourth 2-input multiplexer 128, a real scrambled chip value $C_I$ 302, an imaginary scrambled chip value $C_Q$ 304, and an exclusive-OR function 306.

In FIG. 3, the negation blocks 104 and 110 receive the real chip value $D_I$ 102 and the imaginary chip value $D_Q$ 108 respectively and generate the negated real chip value $-D_I$ 106 and the negated imaginary chip value $-D_Q$ 112. The first multiplexer 114 selects either the real chip value $D_I$ 102 or the negated real chip value $-D_I$ 106 in response to the real scrambling code value $S_I$ 116. The second multiplexer 118 selects either the imaginary chip value $D_Q$ 108 or the negated imaginary chip value $-D_Q$ 112 in response to the imaginary scrambling code value $S_Q$ 120. The exclusive-OR function 306 encodes the real and imaginary values of the scrambling code ($S_I$, $S_Q$). The third multiplexer 126 selects either the output of the first multiplexer 114 or the output of the second multiplexer 118 in response to the encoded scrambling code ($S_I$, $S_Q$) from the exclusive-OR function 306 to generate the real scrambled chip value $C_I$ 302. The fourth multiplexer 128 selects either the output of the first multiplexer 114 or the output of the second multiplexer 118 in response to the encoded scrambling code ($S_I$, $S_Q$) from the exclusive-OR function 306 to generate the imaginary scrambled chip value $C_Q$ 304.

In this example, the negation blocks 104 and 110 and the 2-input multiplexers 114, 118, 126 and 128 are identical to those used in the scrambler 100 of FIG. 1, however, other means for performing the functions of negation and multiplexing may be used according to well-known techniques to practice various embodiments of the present invention within the scope of the appended claims, including, but not limited to, gate arrays, computers, and digital signal processors.

A significant advantage of the complex multiplication circuit 300 of FIG. 3 over that of FIG. 1 is that no addition functions are required, thereby eliminating approximately 400 gates from the hardware implementation.

To implement the complex multiplication circuit 300 as a descrambler, the inputs of multiplexers 118, 126 and 128 may be swapped in the same manner as described above for the multiplexers 118 and 126 in FIG. 1.

Figure 4:
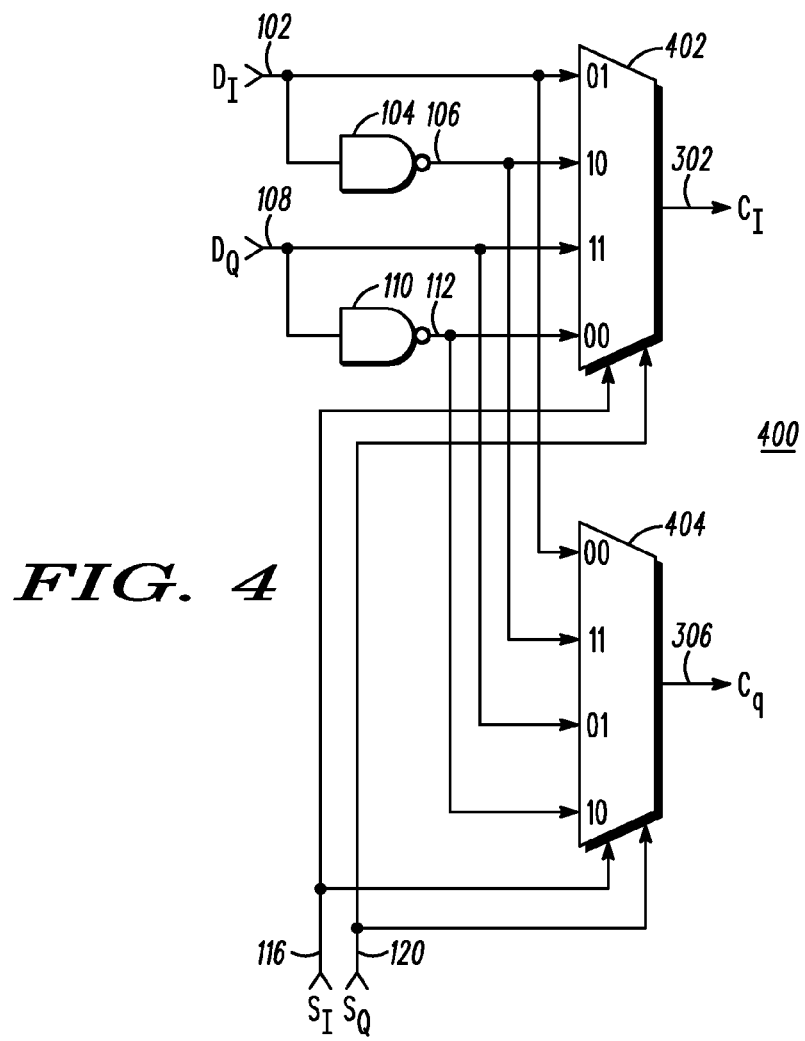
FIG. 4 illustrates a diagram of a complex multiplication circuit according to an alternative embodiment of the present invention.

In another embodiment of the present invention, the complex multiplication function illustrated in Table 1 may be implemented by two negation blocks and two 4-input multiplexers, for example, as illustrated in FIG. 4.

FIG. 4 illustrates a diagram of a complex multiplication circuit 400 according to an alternative embodiment of the present invention. Shown in FIG. 4 are a real chip value $D_I$ 102, a first negation block 104, a negated real chip value $-D_I$ 106, an imaginary chip value $D_Q$ 108, a second negation block 110, a negated imaginary chip value $-D_Q$ 112, a real scrambling code value $S_I$ 116, an imaginary scrambling code value $S_Q$ 120, a real scrambled chip value $C_I$ 302, an imaginary scrambled chip value $C_Q$ 304, a first 4-input multiplexer 402, and a second 4-input multiplexer 404.

In the example of FIG. 4, the real and imaginary values of the scrambling code ($S_I$, $S_Q$) are paired to generate the multiplexer address for each of the 4-input multiplexers 402 and 404 to select the real and imaginary values of the complex product ($C_I$+$jC_Q$) from the real chip value $D_I$ 102, the negated real chip value $-D_I$ 106, the imaginary chip value $D_Q$ 108, and the negated imaginary chip value $-D_Q$ 112.

Figure 5:
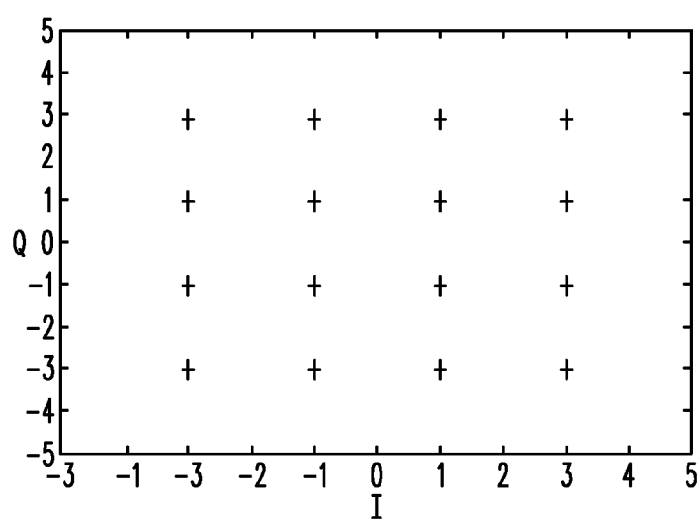
FIG. 5 illustrates a lattice plot of a 16-QAM signal after scrambling using the scrambler of FIG. 3 or FIG. 4.

Another important feature of the present invention is the selection of the phasor constant ($P_I$+$jP_Q$) so that the axes of the lattice plot are rotated to coincide with the natural axes of the scrambled chip values as illustrated in FIG. 5.

The complex multiplication circuit 400 may be implemented as a descrambler, for example, by changing the inputs of the multiplexer 402 from "01", "10", "11" and "00" to "00", "11", "10" and "01" respectively, and the inputs of the multiplexer 404 from "00", "11", "01", and "10" to "01", "10", "00" and "11" respectively.

FIG. 5 illustrates a lattice plot 500 of a 16-QAM signal after scrambling using the scrambler 300 of FIG. 3 or the scrambler 400 of FIG. 4. For a 12-bit digital-to-analog converter (DAC), 12-bit clipping is required along the I and Q axes of the lattice plot 500 that coincide with the lattice geometry of the scrambled chip values. As may be appreciated from FIG. 5, selecting a value of the phasor constant ($P_I$+$jP_Q$) so that the I and Q axes of the lattice plot 500 coincide with the lattice geometry of the scrambled chip values according to the method of the present invention results in a higher dynamic range for a given digital-to-analog converter resolution. Also, rotating the I and Q axes of the lattice plot 500 to coincide with the lattice geometry of the scrambled chip values results in reduced peak-to-average power of the 16-QAM signal on the separate I and Q components compared to the scrambler 100 of FIG. 1. Reducing the peak-to-average power of the 16-QAM signal advantageously reduces the performance requirements of the radio frequency power amplifier used to transmit the spread spectrum signal, further reducing the cost of the transmitting device.

Figure 6:
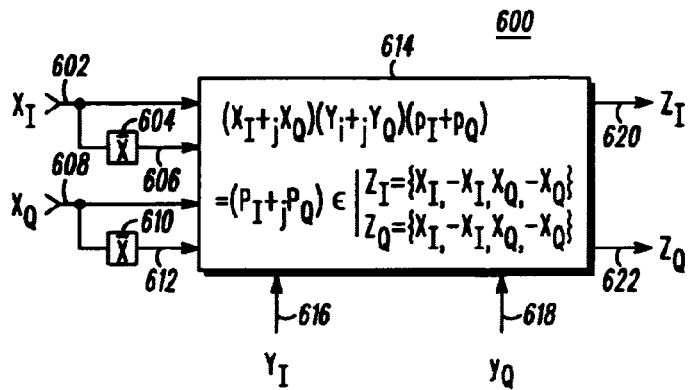
FIG. 6 illustrates a block diagram of a complex multiplication circuit according to a generalized embodiment of the present invention.

A method and apparatus for complex multiplication according to a further embodiment of the present invention may be generalized to include other multiplicands besides chip values, other multipliers besides scrambling code values, and other phasor constant values in addition to those described with reference to FIGS. 3 and 4 above according to well-known techniques to practice various embodiments of the present invention within the scope of the appended claims as illustrated in FIG. 6.

FIG. 6 illustrates a block diagram of a complex multiplication circuit 600 according to a generalized embodiment of the present invention. Shown in FIG. 6 are a real value of a complex multiplicand $X_I$ 602, a first negation function 604, a negated real value of the complex multiplicand $X_I$ 606, an imaginary value of the complex multiplicand $X_Q$ 608, a second negation function 610, a negated imaginary value of the complex multiplicand $X_I$ 612, a complex product selector 614, a real value of a complex multiplier $Y_I$ 616, an imaginary value of the complex multiplier $Y_Q$ 618, a real value of a complex product $Z_I$ 620, and an imaginary value of the complex product $Z_Q$ 622.

In FIG. 6, the complex product selector 614 receives the real value of a complex multiplicand $X_I$ 602, the negated real value of the complex multiplicand $X_I$ 606, the imaginary value of the complex multiplicand $X_Q$ 608, the negated imaginary value of the complex multiplicand $X_I$ 612, the real value of a complex multiplier $Y_I$ 616, and the imaginary value of the complex multiplier $Y_Q$ 618. Alternatively, the negation functions may be included in the complex product selector 614. The complex product selector 614 generates the product of the complex multiplicand $(X_I+jX_Q)$ times the complex multiplier $(Y_I+jY_Q)$ times the phasor constant $(P_I+jP_Q)$ by selecting the real value of the complex product $Z_I$ 620 from the set $\{X_I, -X_I, X_Q, -X_Q\}$ and the imaginary value of the complex product $Z_Q$ 622 from the set $\{X_I, -X_I, X_Q, -X_Q\}$ for each value of the complex multiplicand $(X_I+jX_Q)$.

Figure 7:
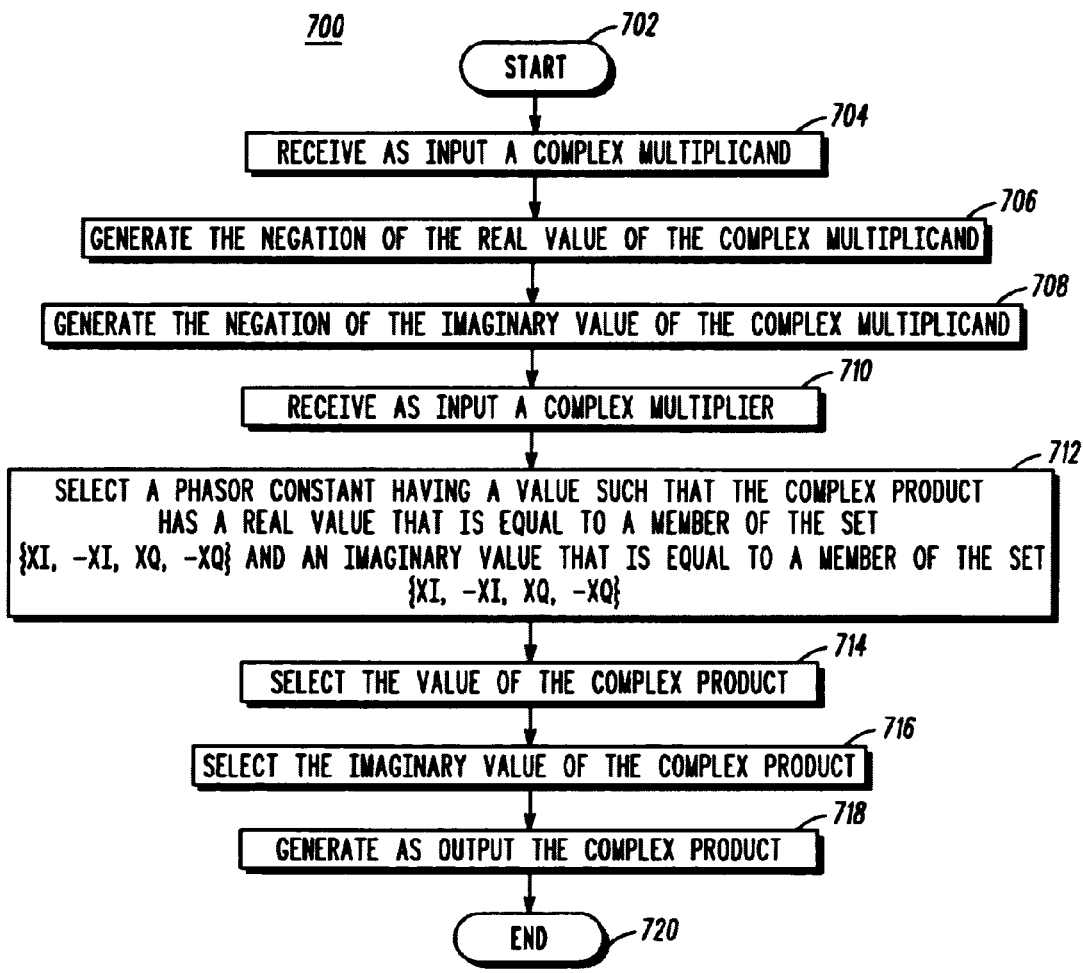
FIG. 7 illustrates a flow chart of the method of complex multiplication implemented by the complex multiplication circuit of FIG. 6.

FIG. 7 illustrates a flow chart 700 of the method of complex multiplication implemented by the complex multiplication circuit of FIG. 6.

Step 702 is the entry point of the flow chart 700.

In step 704, a complex multiplicand $(X_I+jX_Q)$ having a real value $X_I$ and an imaginary value $X_Q$ is received as input. The complex multiplicand $(X_I+jX_Q)$ may be, for example, a non-scrambled or scrambled chip value of a spread spectrum communications signal.

In step 706, a negation of the real value $X_I$ of the complex multiplicand $(X_I+jX_Q)$ is generated, for example, by a NAND gate, a computer instruction, or other means of negating a signal according to well-known techniques.

In step 708, a negation of the imaginary value $X_Q$ of the complex multiplicand $(X_I+jX_Q)$ is generated, for example, by a NAND gate, a computer instruction, or other means of negating a signal according to well-known techniques.

In step 710, a complex multiplier $(Y_I+jY_Q)$ having a real value $Y_I$ and an imaginary value $Y_Q$ is received as input. The complex multiplier $(Y_I+jY_Q)$ may be, for example, a scrambling code if scrambling is to be performed by the complex multiplication, or the complex multiplier $(Y_I+jY_Q)$ may be the complex conjugate of the scrambling code, if descrambling is to be performed by the complex multiplication.

In step 712, a phasor constant $(P_I+jP_Q)$ is selected having a value such that the complex product $(Z_I+jZ_Q)$ of the complex multiplicand $(X_I+jX_Q)$ times the complex multiplier $(Y_I+jY_Q)$ times the phasor constant $(P_I+jP_Q)$ has a real value $Z_I$ that is equal to a single member of the set $\{X_I, -X_I, X_Q, -X_Q\}$ and an imaginary value $Z_Q$ that is equal to a single member of the set $\{X_I, -X_I, X_Q, -X_Q\}$ for each of the possible values of the complex multiplicand $(X_I+jX_Q)$. For a 16-QAM scrambler/descrambler, the phasor constant $(P_I+jP_Q)$ preferably has a value equal to $(1+j)/2$ for an overall gain of unity and a phase rotation angle of 45, 135, 225, or 315 degrees.

In step 714, the real value of the complex product $Z_I$ is selected from the set $\{X_I, -X_I, X_Q, -X_Q\}$.

In step 716, the imaginary value of the complex product $Z_Q$ is selected from the set $\{X_I, -X_I, X_Q, -X_Q\}$.

In step 718, the complex product $(Z_I+jZ_Q)$ is generated as output.

Step 720 is the exit point of the flow chart 700.

Although the method of the present invention illustrated by the flowchart descriptions above are described and shown with reference to specific steps performed in a specific order, these steps may be combined, sub-divided, or reordered without departing from the scope of the claims. Unless specifically indicated herein, the order and grouping of steps is not a limitation of the present invention.

The application of a complex multiplier of the present invention to spread spectrum communications systems, for example, code division multiple access and wideband code division multiple access communications systems, offers benefits that include greater dynamic range of the transmitted signal, reduced signal clipping, smaller circuit area, faster scrambling speeds, and improved circuit reliability using fewer components and fewer steps than required by previous scrambler/descrambler devices previously used in cellular telephones.

While the invention herein disclosed has been described by means of specific embodiments and applications thereof, numerous modifications and variations may be made thereto by those skilled in the art without departing from the scope of the invention set forth in the following claims.

What is claimed is:

1. A method of complex multiplication comprising steps of:
    (a) receiving a complex multiplicand having a real value and an imaginary value;
    (b) generating a negation of the real value of the complex multiplicand;
    (c) generating a negation of the imaginary value of the complex multiplicand;
    (d) receiving a complex multiplier; and
    (e) selecting a phasor constant having a value wherein a complex product of the complex multiplicand times the complex multiplier times the phasor constant has a real value equal to one of the real value of the complex multiplicand, the imaginary value of the complex multiplicand, the negation of the real value of the complex multiplicand, and the negation of the imaginary value of the complex multiplicands,
    wherein the complex multiplication is used in one of scrambling and descrambling spread spectrum communications signals.

2. The method of claim 1 wherein the phasor constant has a value selected so that for each possible value of the complex multiplicand, the complex product has an imaginary value equal to one of the real value of the complex multiplicand, the imaginary value of the complex multiplicand, the negation of the real value of the complex multiplicand, and the negation of the imaginary value of the complex multiplicand for each possible value of the complex multiplicand.

3. The method of claim 1 wherein the multiplicand is a complex chip value for generating a spread spectrum communications signal.

4. The method of claim 1 wherein the multiplier is a complex scrambling code for transmitting a spread spectrum communications signal.

5. The method of claim 1 wherein the multiplier is a complex descrambling code for receiving a spread spectrum communications signal.

6. The method of claim 1 wherein the phasor constant has a phase angle of one of 45, 135, 225, and 315 degrees.

7. The method of claim 1 wherein the phasor constant results in an overall gain of unity in the complex product.

8. The method of claim 1 further comprising a step of generating as output a real value of the complex product by selecting one of the real value of the complex multiplicand, the imaginary value of the complex multiplicand, the negation of the real value of the complex multiplicand, and the negation of the imaginary value of the complex multiplicand.

9. The method of claim 1 further comprising a step of generating as output an imaginary value of the complex product by selecting one of the real value of the complex multiplicand, the imaginary value of the complex multiplicand, the negation of the real value of the complex multiplicand, and the negation of the imaginary value of the complex multiplicand.

10. An apparatus for complex multiplication comprising:
a first negation block for receiving a real value of a complex multiplicand and for generating a negation of the real value of the complex multiplicand;
a second negation block for receiving an imaginary value of the complex multiplicand and for generating a negation of the imaginary value of the complex multiplicand; and
a selector coupled to the first negation block and the second negation block for generating a complex product of the complex multiplicand times a complex multiplier times a phasor constant wherein the phasor constant has a value selected so that for each possible value of the complex multiplicand, the complex product has a real value equal to one of the real value of the complex multiplicand, the imaginary value of the complex multiplicand, the negation of the real value of the complex multiplicand, and the negation of the imaginary value of the complex multiplicand.

11. The apparatus of claim 10 wherein the phasor constant has a value selected so that for each value of the complex multiplicand, the complex product has an imaginary value equal to one of the real value of the complex multiplicand, the imaginary value of the complex multiplicand, the negation of the real value of the complex multiplicand, and the negation of the imaginary value of the complex multiplicand for each possible value of the complex multiplicand.

12. The apparatus of claim 10 wherein the multiplicand is a complex chip value for generating a spread spectrum communications signal.

13. The apparatus of claim 10 wherein the multiplier is a complex scrambling code for transmitting a spread spectrum communications signal.

14. The apparatus of claim 10 wherein the multiplier is a complex descrambling code for receiving a spread spectrum communications signal.

15. The apparatus of claim 10 wherein the phasor constant has a phase angle of one of 45, 135, 225, and 315 degrees.

16. The apparatus of claim 10 wherein the phasor constant results in an overall gain of unity in the complex product.

17. The apparatus of claim 10 wherein the complex product is representative of a scrambled chip of a spread spectrum communications signal.

18. The apparatus of claim 10 wherein the complex product is representative of a descrambled chip of a spread spectrum communications signal.

19. The apparatus of claim 10 wherein the complex product is representative of a scrambled chip of a spread spectrum communications signal transmitted from a cellular telephone.

20. The apparatus of claim 10 wherein the complex product is representative of a descrambled chip of a spread spectrum communications signal received by a cellular telephone.

* * * * *